United States Patent
Krishnamurthy

(10) Patent No.: US 9,959,301 B2
(45) Date of Patent: May 1, 2018

(54) DISTRIBUTING AND PROCESSING STREAMS OVER ONE OR MORE NETWORKS FOR ON-THE-FLY SCHEMA EVOLUTION

(71) Applicant: Cisco Technology, Inc., San Jose, CA (US)

(72) Inventor: Saileshwar Krishnamurthy, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 448 days.

(21) Appl. No.: 14/341,676

(22) Filed: Jul. 25, 2014

(65) Prior Publication Data

US 2016/0026663 A1    Jan. 28, 2016

(51) Int. Cl.
- *G06F 17/30* (2006.01)
- *G06F 9/50* (2006.01)
- *H04L 29/08* (2006.01)

(52) U.S. Cl.
CPC .......... *G06F 17/30321* (2013.01); *G06F 9/50* (2013.01); *G06F 17/30516* (2013.01); *H04L 67/10* (2013.01)

(58) Field of Classification Search
CPC ......... G06F 17/30094; G06F 17/30374; G06F 17/30516; G06F 17/30445; G06F 17/30545

See application file for complete search history.

(56) References Cited

U.S. PATENT DOCUMENTS

| | | | |
|---|---|---|---|
| 6,397,227 B1 | 5/2002 | Klein | |
| 6,418,446 B1 * | 7/2002 | Lection | ............ G06F 17/30896 |
| 6,654,907 B2 | 11/2003 | Stanfill | |
| 7,281,018 B1 * | 10/2007 | Begun | .................. G06F 17/218 |
| 7,383,253 B1 | 6/2008 | Tsimelzon et al. | |
| 7,603,670 B1 | 10/2009 | Van Rietschote | |
| 7,716,473 B1 | 5/2010 | Kraemer | |
| 7,818,313 B1 | 10/2010 | Tsimelzon et al. | |
| 7,979,420 B2 | 7/2011 | Jain | |

(Continued)

OTHER PUBLICATIONS

Fischer et al., "Stream Schema: Providing and Exploiting Static Metadata for Data Stream Processing", EDBT 2010, pp. 207-218, 2010, ACM.*

(Continued)

*Primary Examiner* — Scott A Waldron
*Assistant Examiner* — Fatima Mina
(74) *Attorney, Agent, or Firm* — Hickman Palermo Becker Bingham LLP

(57) ABSTRACT

In an embodiment, a method comprises receiving a first record comprising one or more first fields from a first source computer; in response to determining that the first record is a first type and a first node is associated with the first type, sending the first record to the first node to be processed; receiving a second record comprising the one or more first fields and one or more second fields from a second source computer; in response to determining that the second record is a second type and a second node is associated with the second type, sending the second record to the second node; in response to determining that the second type is a first subtype of the first type, sending the second record to the first node to be processed, without suspending the first node.

20 Claims, 4 Drawing Sheets

(56) References Cited

U.S. PATENT DOCUMENTS

| | | | |
|---|---|---|---|
| 7,984,043 | B1 | 7/2011 | Waas |
| 8,479,216 | B2 | 7/2013 | Lakshmanan |
| 8,554,789 | B2* | 10/2013 | Agrawal ............ G06F 17/2247 707/778 |
| 8,601,458 | B2 | 12/2013 | Andrade |
| 8,745,070 | B2 | 6/2014 | Krishnamurthy |
| 2002/0143728 | A1 | 10/2002 | Cotner et al. |
| 2007/0240061 | A1 | 10/2007 | Cormode et al. |
| 2009/0106214 | A1 | 4/2009 | Jain |
| 2009/0228465 | A1 | 8/2009 | Krishnamurthy et al. |
| 2009/0228434 | A1 | 9/2009 | Krishnamurthy et al. |
| 2010/0082833 | A1 | 4/2010 | Masunaga |
| 2010/0131745 | A1 | 5/2010 | Meijer |
| 2010/0229178 | A1 | 9/2010 | Ito |
| 2011/0093500 | A1 | 4/2011 | Meyer |
| 2011/0131199 | A1 | 6/2011 | Simon et al. |
| 2011/0145828 | A1 | 6/2011 | Takahashi et al. |
| 2011/0167148 | A1* | 7/2011 | Bodziony ............ H04L 43/026 709/224 |
| 2011/0179228 | A1 | 7/2011 | Amit |
| 2011/0208703 | A1 | 8/2011 | Fisher et al. |
| 2011/0302164 | A1 | 12/2011 | Krishnamurthy et al. |
| 2011/0314019 | A1 | 12/2011 | Jimenez et al. |
| 2012/0078951 | A1 | 3/2012 | Hsu |
| 2012/0078975 | A1 | 3/2012 | Chen et al. |
| 2012/0110042 | A1 | 5/2012 | Barsness |
| 2012/0110599 | A1 | 5/2012 | Schoning |
| 2012/0297249 | A1 | 11/2012 | Yang |
| 2012/0304003 | A1 | 11/2012 | Goldstein |
| 2013/0054537 | A1 | 2/2013 | Graefe |
| 2013/0151563 | A1* | 6/2013 | Addepalli ......... G06F 17/30551 707/792 |
| 2013/0275452 | A1 | 10/2013 | Krishnamurthy |
| 2014/0012877 | A1 | 1/2014 | Krishnamurthy |
| 2014/0032535 | A1 | 1/2014 | Singla |
| 2014/0280325 | A1 | 9/2014 | Krishnamurthy et al. |
| 2014/0379712 | A1 | 12/2014 | LaFuente Alvarez |
| 2016/0026530 | A1 | 1/2016 | Amurthy et al. |

OTHER PUBLICATIONS

Kumar et al., "Resource-Aware Distributed Stream Management Using Dynamic Overlays", Proceedings of the 25th IEEE International Conference on Distributed Computing Systems, 2005, IEEE.*

Abadi et al., "Aurora: a new model and architecture for data stream management", The VLDB Journal (2003) 12, pp. 120-139, 2003, Springer-Verlag.*

U.S. Appl. No. 13/936,922, filed Jul. 8, 2013, Notice of Allowance, dated Oct. 21, 2014.

U.S. Appl. No. 13/865,054, filed Apr. 17, 2013, Office Action, dated Feb. 20, 2015.

U.S. Appl. No. 13/839,148, filed Mar. 15, 2013, Office Action, dated Mar. 26, 2015.

U.S. Appl. No. 14/341,436, filed Jul. 25, 2014, Notice of Allowance, dated May 12, 2016.

U.S. Appl. No. 13/865,054, filed Apr. 17, 2013, Final Office Action, dated Jun. 4, 2015.

U.S. Appl. No. 13/344,559, filed Jan. 5, 2012, Notice of Allowance, dated Jan. 22, 2014.

U.S. Appl. No. 13/344,562, filed Jan. 5, 2012, Office Action, dated Jun. 14, 2013.

U.S. Appl. No. 13/344,559, filed Jan. 5, 2012, Final Office Action, dated Jan. 16, 2013.

U.S. Appl. No. 13/344,559, filed Jan. 5, 2012. Office Action, dated Jun. 13, 2012.

U.S. Appl. No. 13/344,559, filed Jan. 5, 2012, Interview Summary, dated Apr. 23, 2014.

U.S. Appl. No. 13,344,562, filed Jan. 5, 2012, Office Action, dated Jun. 14, 2012.

U.S. Appl. No. 13/865,054, filed Apr. 17, 2013, Notice of Allowance, dated Sep. 17, 2015.

U.S. Appl. No. 13/839,148, filed Mar. 15, 2013, Final Office Action, dated Oct. 21, 2015.

International Searching Authority, "Search Report" in application No. PCT/US2015/040735, dated Oct. 20, 2015, 10 pages.

Claims in application No. PCT/US2015/040735, dated Oct. 2015, 6 pages.

European Patent Office, "Search Report" in application No. PCT/US2015/040734, dated Nov. 3, 2015, 12 pages.

European Claims in application No. PCT/US2015/040734, dated Nov. 2015, 7 pages.

Cranor et al., "Gigascope" Proceedings of the 2003 ACM Sigmod International Conference on Management Data, dated Jan. 1, 2003, 23 pages.

Arasu et al., "The CQL Continuous Query Language: Semantic Foundations and Query Execution", The VLDB Journal dated 2006, 22 pages.

U.S. Appl. No. 13/839,148, filed Mar. 15, 2013, Office Action, dated Jun. 17, 2016.

Yali Zhu et al., "Dynamic Plan Migration for Continous Queries Over Data Streams", dated 2004, 12 pages.

Babu et al., "Continuous Queries over Data Streams." pp. 109-120; Sep. 2001; 12pgs.

U.S. Appl. No. 13/839,148, filed Mar. 15, 2013, Notice of Allowance, dated Sep. 30, 2016.

Tucker, Peter A. et al., "Exploiting Punctuation Semantics in Continuous Data Streams", IEEE Transactions on Knowledge and Data Engineering.

T. Johnson et al., "A Heartbeat Mechanism and its Application in Gigascope", Proceedings of the 31st VLDB Conference.

Nalamwar, A., "Blocking Operators and Punctuated Data Streams in Continuous Query Systems" Compter Science.

Krishnamurthy, Sailesh et al., TelegraphCQ: Continuous Dataflow Processing for an Uncertain World, Proceddings of the 1st CIDR Conference, Asilmoar, dated 2003.

Krishnamurthy, Sailesh et al., TelegraphCQ: An Architectural Status Report., Bulletin of the IEEE Computer Society Technical Committee on Data Engineering, dated Nov. 18, 2003.

Krishnamurthy, Sailesh et al., "The Case for Precision Sharing.", Proceedings of the 30th VLDB Conference, Toronto, Canada, dated 2004.

Krishnamurthy, Sailesh et al., "Shared Hierarachical Aggeration for Monitoring Distributed Streams", Report No. UCB/CSD-05-1381, dated Oct. 18, 2005.

Krishnamurthy, Sailesh et al., "On-the-Fly Sharing for Streamed Aggregation.", SIGMOD Conference 2006, Chicago, Illinois, dated Jun. 27-29, 2006.

Franklin et al., "Design Considerations for High Fan-in Systems: the HiFi Approach." Proceedings of the 29th VLDB Conference, Berlin Germany, dated 2003.

Altinel et al., "Cache Tables: Paving the Way for an Adaptive Database Cache.", Proceedings of the 29th VLDB Conference, Berlin, Germany, dated 2003.

"Shared Query Processing in Data Streaming Systems", by Saileshwar krishnamurthy, fall 2006, http://citeseerx.ist.psu.edu/viewdoc/download?Doi=10.1.1.122.1989&rep1&type=pdf.

Krishnamurthy, U.S. Appl. No. 13/839,148, filed Mar. 15, 2013, Office Action, dated Jul. 5, 2017.

Krishnamurthy, U.S. Appl. No. 13/839,148, filed Mar. 15, 2013, Notice of Allowance, dated Oct. 31, 2017.

* cited by examiner

DISTRIBUTING AND PROCESSING STREAMS OVER ONE OR MORE NETWORKS FOR ON-THE-FLY SCHEMA EVOLUTION

FIELD OF THE DISCLOSURE

The present disclosure relates to computers and computer-implemented techniques useful in management of computer networks including network management databases relating to analytics. The disclosure relates more specifically to techniques for processing continuous queries of network management data without suspending and reconfiguring currently executing queries.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Data communication networks may comprise one or more computing nodes. Each node may receive and process unbounded, streaming data according to a particular schema. A schema may define the content, and/or the format of the content, in a data stream. Each node may send results to one or more downstream nodes, persistent storages, and/or some other receiving device, according to a schema.

In a modern data-driven sy1stem, the schema or format of a data stream may change at will. For example, a schema for a network data stream may include frequent status reports for each mission critical device on the network, which includes the device's Internet Protocol address and a time stamp and may change to include the power consumption, CPU usage, and available memory on each device.

A change in a data stream's schema may cause may cause a node to stop. However, some scenarios require that a node remain processing, in which cases the node is not allowed to be suspended or reconfigured to take advantage of a schema change.

Figure 1:
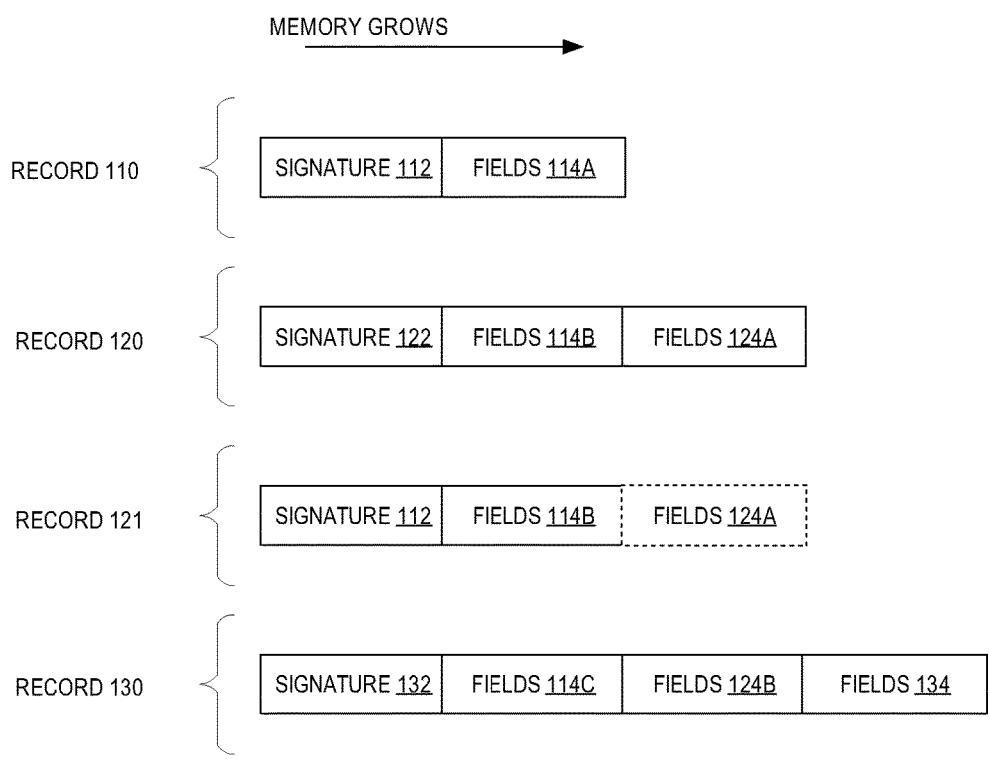
FIG. 1 illustrates a plurality of records that are one or more types in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Techniques for distributing and processing independent data streams over one or more networks are described. In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:
  1.0 Overview
  2.0 Structural and Functional Overview
    2.1 Subtypes, Super-Types, Subsets, and Supersets
      2.1.1 Subtypes, Super-Types, Subsets, and Supersets
      2.1.2 Casting Instances of Subtypes to Super-Types
    2.2 Example System Topology
      2.2.1 Routing Module
      2.2.2 Nodes
      2.2.3 Sources
      2.2.4 Record Storage
  3.0 Process Overview
    3.1 Receiving Continuous Queries
    3.2 Generating, Instantiating, and/or Initializing Nodes based on the Continuous Queries
    3.3 Determining Subtypes
    3.4 Processing Records
    3.5 Casting Records without Suspending Nodes
    3.6 Processing Cast Records without Suspending Nodes
    3.7 Processing New, Later-Defined Types of Records without Suspending Nodes
  4.0 Implementation Mechanisms—Hardware Overview
  5.0 Extensions and Alternatives

1.0 OVERVIEW

In an embodiment, a computer system comprises a first node computer comprising a first processor and a first memory configured to process one or more first type of records based on a first operation; a second node computer comprising a second processor and a second memory configured to process one or more second type of records based on a second operation; a routing computer comprising a processor, a memory, and a routing module configured to: receive a first record comprising one or more first fields from a first source computer; in response to determining that the first record is a first type and the first node computer is associated with the first type, send the first record to the first node computer to be processed; receive a second record comprising the one or more first fields and one or more second fields from a second source computer; in response to determining that the second record is a second type and the second node computer is associated with the second type, sending the second record to the second node computer to be processed; in response to determining that the second type is a first subtype of the first type, sending the second record to the first node computer to be processed, without suspending and reconfiguring the first node computer.

In an embodiment, a method comprises receiving a first record comprising one or more first fields from a first source computer; in response to determining that the first record is a first type and a first node is associated with the first type, sending the first record to the first node to be processed; receiving a second record comprising the one or more first fields and one or more second fields from a second source computer; in response to determining that the second record is a second type and a second node is associated with the second type, sending the second record to the second node; in response to determining that the second type is a first subtype of the first type, sending the second record to the first node to be processed, without suspending the first node.

In an embodiment, the method comprises in response to determining that the first record is the first type and the first node is associated with the first type, sending a first signature with the first record to the first node; in response to determining that the second record is the second type and the second node is associated with the second type, sending a second signature with the second record to the first node; in response to determining that the second type is the first subtype of the first type, sending the first signature with the second record to the first node.

In an embodiment, the method comprises organizing the one or more first fields in the first record according to one or more first indices; organizing the one or more first fields in the second record according to the one or more first indices; organizing the one or more second fields in the second record according to one or more second indices, wherein each index in the one or more first indices references a memory address that is before the memory address referenced by each index in the one or more second indices.

In an embodiment, the method comprises receiving, from a third source computer, a third record comprising the one or more first fields, the one or more second fields, and one or more third fields; in response to determining that the third record is a third type and a third node is associated with the third type, sending the third record to the third node to be processed; in response to determining that the third type is a second subtype of the second type, sending the third record to the second node to be processed without suspending and reconfiguring the second node; in response to determining that the second type is the first subtype of the first type, sending the third record to the first node to be processed without suspending and reconfiguring the first node.

2.0 STRUCTURAL AND FUNCTIONAL OVERVIEW

Data communication networks may comprise one or more computing nodes. Each node may receive and process unbounded, streaming data according to a particular schema. A schema may define the content, and/or the format of the content, in a data stream. Each node may send results to one or more downstream nodes, persistent storages, and/or some other receiving device, according to a schema.

Suspending a node may cause many problems. Suspending may include halting a node and/or otherwise causing a node to stop processing one or more input data streams. For example, a node may process time-critical data, such as networking, power, or rocket telemetry data. If the node is suspended, a downstream node or device may be unable to perform its functions properly or may derive misleading data from the lack of data received for the suspended node. For example, the downstream node or device may determine that a network is down or a rocket has lost contact, however the data not processed by the suspended node may indicate that a network is excellent connectivity with one or more other networks or that a rocket is performing within mission parameters.

Suspending a node may cause massive reserve resources dedicated to the node or data loss. For example, a node may process a data stream that continuously delivers a large amount of data. If the node is suspended, then a large amount of data may begin to build up, which may need to be stored in a large persistent data store. Even data may still be lost even if unprocessed data is stored in the large persistent data store. For example, if the node is offline for too long, then the data store fill to capacity. Thus, either new data may not be stored, or the older, unprocessed data may be deleted to make room for the newly received data. Furthermore, if the bandwidth of the data received is greater than the bandwidth of the persistent storage, then some data may be lost or overwritten while waiting in a volatile buffer waiting to be written to persistent storage.

Suspending a node may cause one or more data sources to fail. For example, if a data source receives an exception error because a receiving node is suspended, then the data source may exit. Thus, even with the suspended node resumes processing the data source may have terminated.

In a modern data-driven system, the schema or format of a data stream may change at will. For example, a schema for a network data stream may include frequent status reports for each mission critical device on the network, which includes the device's Internet Protocol address and a time stamp and may change to include the power consumption, CPU usage, and available memory on each device.

In response to schema changes, a node may be suspended, reconfigured, and resumed. Continuing with the previous example, if the data consumer administrating the node wishes to process and/or use the new data in the data stream (the power consumption, CPU usage, and available memory on each device), then the administrator may suspend the node, reconfigure the node to make use of the new data, and resume the node. The data sent while the node is offline may be lost or, if possible, stored in a persistent storage when the node comes back online.

After a node resumes processing, the node may not immediately begin processing the most recent data. Continuing with the previous example, when the reconfigured node resumes, the node may process the data stored in persistent storage first, meanwhile newly received data may continue to be stored in persistent storage or lost. For example, if the persistent storage's bandwidth is insufficient to support the reads requested by the node and the writes from the data stream, then the data in the data stream may be lost while the data from persistent storage is processed by the node.

A change in a data stream's schema may cause a node to be suspended, which in turn may cause many problems, as discussed above, and may be prone to error. Furthermore, some scenarios require that a node remain processing, in which cases the node is not allowed to be suspended or reconfigured to take advantage of a schema change. Thus, gracefully and efficiently supporting schema changes without downtime is extremely valuable.

One or more systems and methods are discussed herein to process input data streams that conform to changing schemas without suspending and/or reconfiguring running nodes. Suspending a node may mean stopping a node from processing and/or executing one or more continuous queries that are based on a first type of record. A continuous query may comprise one or more continuous queries, sub-queries, operations defined in a continuous query, and/or sub-operations defined in a continuous query. Reconfiguring a node may mean suspending a node and/or causing the node to execute and/or process one or more new continuous queries based on a second, different type of record that is a subtype of the first type of record. Additionally or alternatively, reconfiguring a node may mean causing a node to execute and/or process one or more new continuous queries that perform a super set of the functionality of the one or more first continuous queries.

Data streams may comprise one or more records sent over time. A record in a data stream may be organized according to a schema. Records that are organized according to a first schema may be referred to as a "first type" or a "first type of record". Records that are organized according to a second schema may be referred to as a "second type" or "second type of record".

One or more systems and methods are discussed herein for a first node, configured to process a first type of record, to also process a second type of record without suspending and/or reconfiguring the first node. For example, a record that is a second type of record may be cast as the first type of record and processed by the first node without suspending and/or reconfiguring the first node. Accordingly, one or more systems and methods are discussed herein to cast a second type of record as a first type of record, and process the second type of record as if the record was originally received as a first type of record.

2.1 Records and Types

A record may comprise one or more fields. A record may also comprise an express signature. A "bare" record does not include an express signature. A bare record may, but need not, include an implied signature. A signature may include one or more values and/or data structures that identify the record a particular type of record. One or more of the systems and/or methods discussed herein may append and/or prepend a signature to a record, such that the record is no longer a bare record.

FIG. 1 illustrates a plurality of records that are one or more types in an example embodiment. In FIG. 1, record 110 is an example first type of record and comprises signature 112 and fields 114A. Signature 112 may identify record 110 as a first type of record. Fields 114A may comprise one or more values, key-value pairs, lists of values and/or key-value pairs, hierarchical data structures, pointers, and/or any other data structures.

Record 120 is an example second type of record and comprises signature 122, fields 114B, and fields 124A. Signature 122 may identify record 120 as a second type of record. Fields 114B in record 120 has the same format and/or data structure(s) as fields 114A in record 110, but the values may be different. Fields 124A may comprise one or more different and/or additional values, key-value pairs, lists of values and/or key-value pairs, hierarchical data structures, pointers, and/or any other data structures that are not included in fields 114B.

In the example records illustrated in FIG. 1, each record includes an "express" signature comprising value and/or data structure. For example, record 110 includes signature 112, and record 120 includes signature 122. However, in an embodiment, a signature may be implied by one or more names, values, and/or data structures of one or more fields in the record. For example, any record that includes a field named "address" may be determined to be an instance of a first type, and any record that includes a field named "distance" may be determined to be an instance of a second type. A record that includes both a field name "address" and a field name "distance" may be determined to be an instance of both the first type and the second type.

2.1.1 Subtypes, Super-Types, Subsets, and Supersets

A second type of record may be referred to herein as a "subtype" of a first type of record if the fields in the second type of record comprise a superset of the required fields in the first type of record. The first type may be referred to herein as a "super-type" and/or a "subset" of the second type. For purposes of illustrating a clear example, assume that the one or more fields in fields 114A are required for a first type of record, and the one or more fields in fields 114B and fields 124A are required for any instance of a second type of record. In the current example, a record that is an instance of the second type also includes the required fields to be an instance of the first type. Thus, the second type is a "subtype" or "superset" of the first type; and, the first type is a "super-type" or "subset" of the second type.

A field may be a required field if it is used by one or more nodes that process the first type of records. Additionally or alternatively, a field may be a required field if the field is designated as required in a schema. For example, a first schema, which defines the first type of record, may include a list of the names of the fields that are required. Additionally or alternatively, the first schema may identify one or more fields in a first data structure as required and one or more fields in a second data structure as optional.

A record may have more than one subtype and/or super-type. For example, record 130 is an example of a third type of record. Record 130 comprises signature 132, fields 114C, fields 124B, and fields 134. Signature 132 may identify record 130 as a third type of record and/or as a record that may be processed by one or more third nodes. Fields 114C in record 130 has the same format and/or data structure(s) as fields 114A in record 110, but the values may be different. Fields 124B in record 130 has the same format and/or data structure(s) as fields 124A in record 120, but the values may be different. In the embodiment illustrated in FIG. 1, the third type of record is a subtype of the first type of record, because the third type of record has the one or more required fields in the first type (fields 114A in record 110 and fields 114C in record 130). The third type of record is a subtype of the second type of record, because the third type of record has the one or more required fields in the second type (fields 124A in record 120 and fields 124B in record 130).

The signature and fields of each record in FIG. 1 are illustrated as if contiguous in memory. However, the signature and/or fields of each record need not be contiguous. For example, signature 122, fields 114B, and fields 124A in record 120 may, but need not, be stored contiguously in memory. Furthermore, each field in fields 114A and/or fields 114B may, but need not, be stored contiguously in memory.

2.1.2 Casting Instances of Subtypes to Super-Types

Records that are a subtype of another type may be cast as a super-type by changing the signature, fields, and/or data structures in the records. For example, record 121 is a copy of record 120, which is a second type of record, cast as a super-type: the first type. Record 121 comprises signature 112, fields 114B, and fields 124A. Just as in record 110, signature 112 in record 121 may include one or more values and/or data structures that identify record 121 as a first type and/or as a record to be processed by one or more first nodes associated with signature 112 and/or the first type. However, the one or more first nodes may disregard fields 124A in record 121.

One or more fields that are not in a super-type may be stored higher memory address space. For example, in FIG. 1, memory addresses grow from left to right. Thus, in record 120, a first index that references fields 114B is less than a second index that references fields 124A. A first node that processes the first type of record may use the same index to reference fields 114A in record 110 and fields 114B in record 121, because fields 124A are assigned a higher memory address. Thus, the first node may process record 121 as if record 121 was originally a first type of record.

Common fields between a subtype and a super-type may be stored in the same order. For example, fields 114C and fields 124B in record 130 are in the same order as fields 114B and fields 124A in record 120. A node that processes the second type of records may use the same indices to reference fields 114B and fields 124A in record 120 as fields 114C and fields 124B in record 130. Furthermore, a node that processes the first type of records may use the same index to reference fields 114A in record 110, fields 114B in record 120, fields 114B in record 121, and fields 114C in record 130.

2.2 Example Multi-Node System Topology

Figure 2:
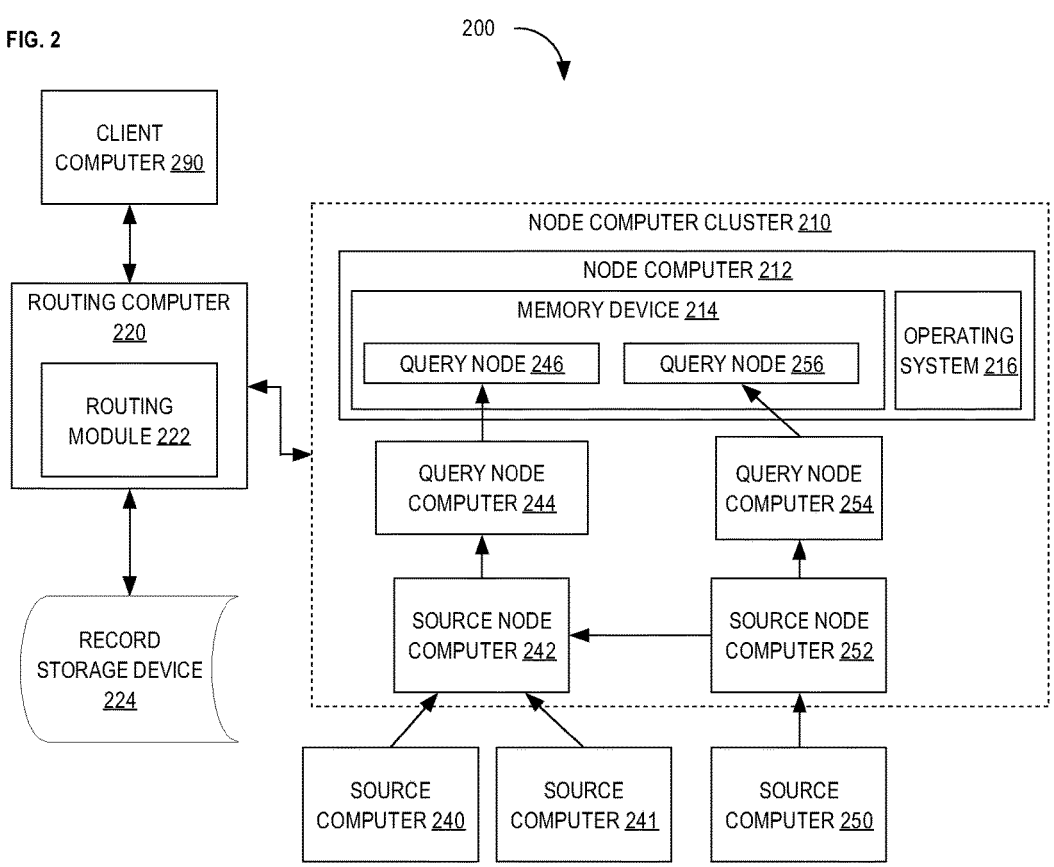
FIG. 2 illustrates a system for processing different types and subtypes of streaming input data from a plurality of sources without suspending one or more nodes in an example embodiment.

FIG. 2 illustrates a system for processing different types and subtypes of streaming input data from a plurality of sources without suspending one or more nodes in an example embodiment. In FIG. 2, system 200 includes node computer cluster 210, routing computer 220, record storage device 224, source computer 240, source computer 241, source computer 250, and client computer 290 distributed across a plurality of interconnected networks. Node cluster 210 includes source node computer 242, query node computer 244, source node computer 252, query node computer 254, and node computer 212, distributed across one or more interconnected networks and may perform one or more of the method discussed herein.

A computer may be one or more software modules, computers, computer components, computing devices, databases, data stores, routers, switches, and/or other elements of internetworking infrastructure. Unless expressly stated as a "single" computer, a computer may be one or more computers.

More than one node may be executed on a single computer. For example, node computer 212 includes query node 246 and query node 256, which are executed on node computer 212, based on operating system 216, and at least partially reside in memory device 214.

While one or more of the components listed above may be illustrated as if running on a separate, remote computer from each other, one or more of the components listed above may be part of and/or executed on the same computer. For example, routing module 222, record storage device 224, source computer 250, source node computer 252, query node computer 254, and/or any of the devices and/or modules included therein, may be executed on the same, single computer, local area network, and/or wide area network.

2.2.1 Routing Module

Routing computer 220 includes routing module 222. Routing module 222 may receive one or more requests and/or queries from one or more client computers, generate one or more nodes, receive one or more records from one or more sources, nodes, modules, and/or computers, and/or send one or more records to the one or more other sources, nodes, modules, and/or computers. Additionally or alternatively, routing module 222 may store records in record storage device 224. Additionally or alternatively, routing module 222 may send records and/or results to client computer 290 and/or any other modules, nodes, and/or computers.

A module may be software executed on a computer and/or a hardware that includes logic, and/or is coupled to, a computer. A module may include instructions and/or logic, which when executed cause performance of one or more of the methods discussed herein.

A routing module may receive and/or execute one or more continuous queries. A continuous query is a query for data, including a query against a database, which defines one or more functions to perform on streaming input data identified as one or more particular types. A continuous query may be defined by a query language, such as a structured query language or a continuous query language. A continuous query can be issued either as, or as part of, a database query or a data definition language command. The one or more functions defined by a continuous query may be database specific functions, networking functions, analytic functions, multimedia functions, and/or any other streaming data functions. For example, a continuous query may specify summarizing, aggregating, or filtering network analytics data in a network management application. A continuous query may define one or more data stream sources, schemas, types, subtypes, and/or super-types. A continuous query may define one or more operations assigned to one or more nodes. The continuous query may instruct the one or more nodes to wait for data to arrive, process the data, and then output derived, processed data. The features and processes discussed herein may be used for various purposes, such as streaming analytic data, debugging and diagnostics, recovery from failures, as well as in storing and processing previously received streaming data.

Routing module 222 may generate one or more types of nodes to execute one or more types of records based on one or more continuous queries. A first node may be a "first type of node" if the node processes a first type of record. Similarly, a second node may be a "second type of node" if the node processes a second type of record. In response to receiving a continuous query defining a first type of record received from source computer 240, routing module 222 may generate, instantiate, and/or initialize source node computer 242, query node computer 244, and query node 246 on node computer 212.

Routing module 222 may orchestrate which records are sent to which nodes and in which order. For example, routing module 222 may associate a first type of record, defined in a first continuous query, with the following nodes in the following order: source node computer 242, query node computer 244, and query node 246. When a first type of record is received, routing module 222 may route the record to source node computer 242. Based, at least in part, on routing module 222, source node computer 242 may send the record, and/or data derived from the record, to query node computer 244. Based, at least in part, on routing module 222, query node computer 244 may send the record, and/or data derived from the record, to query node 246. Based, at least in part on, routing module 222, query node 246 may send the record, and/or data derived from the record, to client computer 290, record storage device 224, and/or any other computer and/or module defined by the continuous query. Accordingly, routing module 222 may comprise one or more tables, databases, and/or data structures for storing associations between one or more continuous queries, types of records, signatures, and/or nodes.

Routing module 222 may manage casting records from a subtype to a super-type and processing the "up-casted" record with the nodes associated with the super-type. For example, routing module 222 may receive a continuous query that defines a second type, and indicates that the second type is a subtype of a first type. In response, routing module 222 may generate, instantiate, and/or initialize the following nodes to process the second type of records in the following order: source node computer 252, query node computer 254, and query node 256. In response to receiving a second type of record, routing module 222 may cast the second type of record as a first type of record, and/or send the up-casted record to the following nodes associated with the first type, in the following order: source node computer 242, query node computer 244, and query node 246. Additionally or alternatively, based on routing module 222, a node may up-cast a record and/or send the up-casted record to one or more nodes in a particular order.

Conventionally, when a record with an updated schema is received, each node previously processing the records may be suspended, reconfigured to process the new data, and resumed. As discussed herein, suspending one or more nodes can cause many problems. In contrast, routing module 222 is unconventional by instantiating new nodes to process the new data in a subtype or record, casting a subtype of record to a super-type of record, and routing the up-casted record to already-running nodes to process the data common between the subtype of record and the super-type of record, without suspending the already-running nodes. Thus, for these and many other reasons discussed herein, the unconventional methods and/or systems discussed herein, such as the methods and systems relating to routing module 222, improve the functioning of the computer(s) and/or computer system(s).

2.2.2 Nodes

A node may be a module, computer, computer component, computing device, database, data store, router, switch, and/or other element of internetworking infrastructure. A node may be defined by circuitry, one or more software instructions, a query, and/or a continuous query. A node may include logic and/or instructions, which when executed perform one or more of the methods discussed herein.

Each node may be configured to perform one or more different tasks, processes, and/or operations than another node. For example, a source node, such as source node computer 242, may receive, format, enqueue, dequeue, and/or send records to one or more nodes, routing modules, and/or storage devices. Source node computer 242 may be specialized to process records that are a first type. Source node computer 252 may perform similar functions as source node computer 242, but may be specialized to process records that are a second type.

Query node computer 244 may be configured to eliminate one or more first type records that do not satisfy one or more criteria, and send the records that do satisfy the one or more criteria to query node 246. Query node 246 may perform one or more operations on the first type of records received from query node computer 244, such as a sum, sort, and/or one or more other operations.

Query node computer 254 may perform one or more different operations on a second type of record, and/or data derived from a second type of record, than query node computer 244 processing an up-casted version of the same record, and/or data derived from the up-casted version of same record. Query node 256 may perform one or more different operations on a second type of record, and/or data derived from a second type of record, than query node 246 processing an up-casted version of the same record, and/or data derived from the up-casted version of same record.

A node that receives one or more records from one or more other nodes may be referred to as a "query node". For example, source node computer 242 may be a source node and query node computer 244 and query node 246 may each be a query node. However, in an embodiment, a source node may perform one or more of the operations that a query node may perform, and/or vice versa. For example, source node computer 242 may receive a record from source node computer 252. Also for example, a source node computer 242 may receive and process a first type of record and need not send the record and/or data derived from the record to a downstream node.

A node may return results to routing module 222, client computer 290, and/or another module and/or computer. For example, query node 246 may receive one or more records indicating the CPU usage for one or more computers. Query node 246 may determine whether the CPU usage for each computer is greater than a particular threshold. If so, query node 246 may send a message to routing module 222 and/or client computer 290 indicating which computer(s) have a CPU usage greater than the particular threshold.

A node may add, remove, and/or change data in a record. For example, query node 246 may append and/or prepend data to each record indicating whether the record included data that satisfied one or more criteria. Query node 246 may send each modified record to routing module 222, record storage device 224, client computer 290, and/or another node and/or computer. Also for example, source node computer 242 may receive a record, and/or a copy of a record, from source node computer 252. Source node computer 252 may have already prepended a signature associated with the second type to the record. Source node computer 242 may determine that the signature is associated with the second type, determine that the second type is associated with the first type as a subtype based on routing module 222, and/or replace the signature with a signature associated the first type.

A node may send a record, modified record, and/or data derived from a record to another node and/or computer. For example, source node computer 242 may send the record to query node computer 244 and/or routing module 222 for further processing. Also for example, routing module 222 may receive the record from source node computer 252. Routing module 222 may modify the record and/or send the record to source node computer 242.

In FIG. 2 a node may send and/or stream records to another node and/or computer directly. For example, source node computer 242 may be hardwired and/or hardcoded to send processed records to one or more nodes, such as query node computer 244. Also for example, source node computer 242 may query routing module 222 for an address and/or identifier of the node that source node computer 242 should send a processed record to, based, at least in part, on a signature of the processed records and/or any other factor discussed herein. In this example, routing module 222 may comprise a relational database that associates the signature of the processed record with the address of query node computer 244. Thus, routing module 22 may return the address of query node computer 244 to source node 242, and source node 242 may send the process record query node computer 244. Additionally or alternatively, a node may send and/or stream data to routing module 222 and/or record storage device 224. Routing module 222 and/or record storage device 224 may push records to one or more nodes. Additionally or alternatively, a node may poll for data from routing module 222 and/or record storage device 224. For example, query node computer 244 may query routing module 222 and/or record storage device 224 for records that source node computer 242 has processed and/or stored in record storage device 224.

2.2.3 Sources

A source computer may be one or more computers streaming one or more particular types of records to one or more source nodes. For example, source computer 240 may be a first generation router on a first network, source computer 241 may be a first generation router on a second network, and source computer 250 may be a second generation router on a third network. Source computer 240 and source computer 241 may each send a plurality of records that are a first type of record to source node computer 242.

Source computer 250 may send a plurality of records that are a second type of record to source node computer 252.

In FIG. 1 each of the source computers stream records directly to a source node. Additionally or alternatively, source computers may stream data to routing module 222 and/or record storage device 224. Routing module 222 and/or record storage device 224 may push records to each source node. Additionally or alternatively, each source node may poll for data from routing module 222 and/or record storage device 224.

2.2.4 Record Storage

Record storage device 224 may receive, store, and/or send one or more records. For example, source node computer 242 may receive a plurality of records from source computer 240. Source node computer 242 may request and/or process the records. Source node computer 242 may send the record, and/or data derived from the record, to record storage device 224 to be stored. As query node computer 244 is ready to process the records, query node computer 244 may request and/or receive the records over time from record storage device 224. Additionally or alternatively, routing module 222 may request one or more records in record storage device 224 and send the one or more records to a node and/or computer. Additionally or alternatively, routing module 222 may store one or more records and/or data sent to routing module 222 from one or more nodes and/or computers.

3.0 PROCESS OVERVIEW

Figure 3:
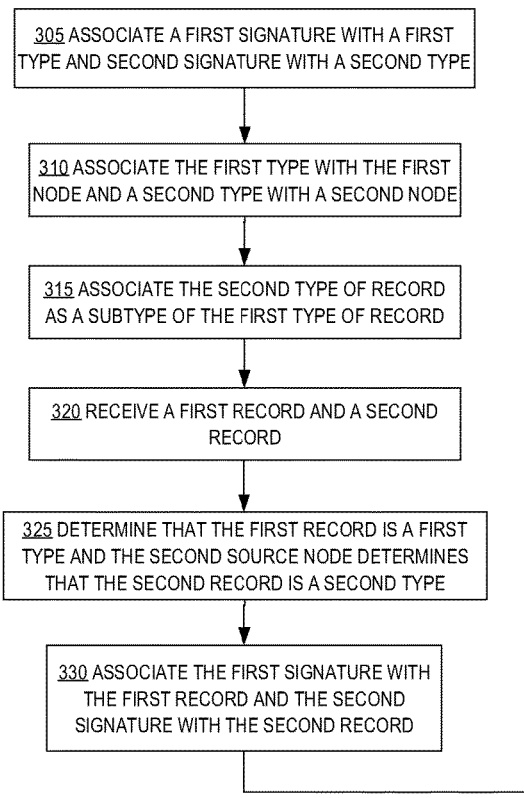
FIG. 3 illustrates a process for processing a plurality of record types in one example embodiment.
Figure 3:
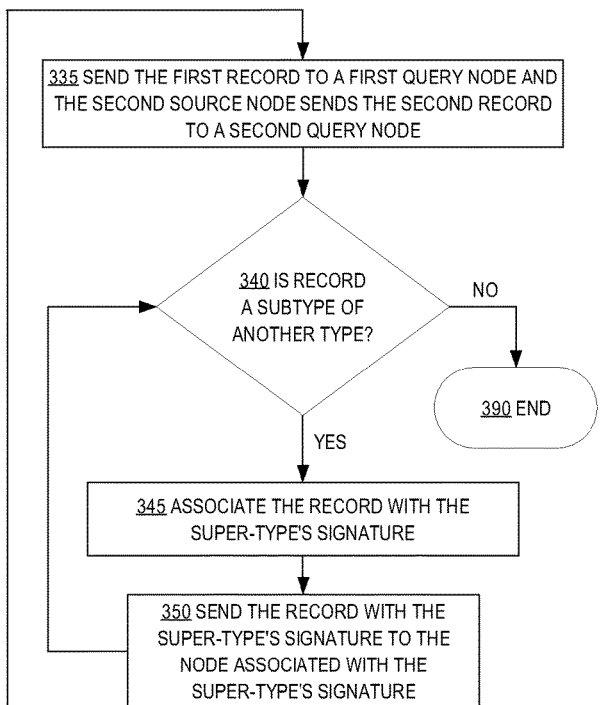

The systems, methods, and/or data structures discussed herein may be used to receive and process records with dynamic and/or evolving schemas without stopping and/or reconfiguring nodes that are already executing. FIG. 3 illustrates a process for processing a plurality of record types in one example embodiment. For purposes of illustrating a clear example, assume that a network administrator is using client computer 290 to analyze and monitor network connectivity between three networks. The first network is communicatively coupled with one or more networks through source computer 240, which is a first generation router; the second network is communicatively coupled with one or more networks through source computer 241, which is also first generation router; and the third network is communicatively coupled with one or more networks through source computer 250, which is a second generation router. Records sent from a first generation router are a first type of record, records sent from a second generation router are a second type of record, and the second type is a subtype of the first type. Accordingly, each record that is a second type may include a "BGP Next Hop" field, whereas a first type of record need not.

3.1 Receiving Continuous Queries

In step 305, a routing module associates a first signature with a first type and second signature with a second type. For example, the network administrator, through client computer 290, may send two continuous queries to routing module 222. The first continuous query may define a first signature for a first type of record to be the value signature 112, and the second continuous query may define a second signature for a second type of record to be the value signature 122. Accordingly, routing module 222 may update and/or store data in routing module 222, routing computer 220, a database, and/or any other computer coupled with routing module 222, which associates signature 112 with the first type of record and signature 122 with the second type of record.

3.2 Generating, Instantiating, and/or Initializing Nodes Based on the Continuous Queries In step 310, the routing module associates the first type with the first node and a second type with a second node. For example, the first continuous query may define one or more operations to be performed on each first type of record. Routing module 222 may analyze the one or more operations and generate, instantiate, and/or initialize source node computer 242 to receive one or more first type of records, query node computer 244 to perform a first operation defined in the first continuous query, and query node 246 to perform a sub-operation defined in the first continuous query. Similarly, the second continuous query may define one or more operations to be performed on each second type of record. Routing module 222 may analyze the one or more operations and generate, instantiate, and/or initialize source node computer 252 to receive one or more second type of records, query node computer 254 to perform a first operation defined in the second continuous query, and query node 256 to perform a sub-operation defined in the second continuous query.

3.3 Determining Subtypes

In step 315, the routing module associates the second type of record as a subtype of the first type of record. For example, the second continuous query may include data that expressly indicates that records of the second type are a subtype of the first type. In response, routing module 222 may associate the second signature (signature 122) with the first signature (signature 112), which indicates that records with the second signature are instances of a subtype of the first type. Additionally or alternatively, routing module 222 may analyze the field(s) expected to be read, and/or written to, by nodes initialized for the second continuous query, and may determine that those fields are a superset of the fields expected to be read, and/or written to, by nodes initialized for the first continuous query. Accordingly, routing module 222 may update and/or store data in routing module 222, routing computer 220, a database, and/or any other computer coupled with routing module 222, which indicates that the second type is a subtype of the first type.

3.4 Processing Records

In step 320, the first node and the second node receive a first record and a second record, respectively. For example, source computer 240 may send a first record, which may be a bare record and/or first type, to source node computer 242. Source computer 250 may send a second record, which may be a bare record and/or second type, to source node computer 252.

Additionally or alternatively, source computer 240 and source computer 250 may send the first record and the second record to routing module 222. Routing module 222 may send the first record to source node computer 242 and the second record to source node computer 252.

Additionally or alternatively, routing module 222 may store the records in record storage device 224. Source node computer 242 may request records associated with the first type from routing module 222. In response, routing module 222 may send the first record to source node computer 242. Similarly, source node computer 252 may request records associated with the second type from routing module 222. In response, routing module 222 may send the second record to source node computer 252. Source node computer 242 and source node computer 252 may poll for records based on the one or more continuous queries, having finished processing one or more previously received records, an amount of time that has elapsed, available central processing unit cycles, available memory, and/or any other factor discussed herein and/or related to one or more computers executing source node computer 242, source node computer 252, routing module 222, and/or record storage device 224.

In step 325, the first source node determines that the first record is a first type and the second source node determines that the second record is a second type. For example, source node computer 242 may determine that the first record is a first type based on the source, format, schema, and/or any other express and/or implied attribute(s) of the first record. Source node computer 252 may determine that the second record is a second type based on the source, format, schema, and/or any other express and/or implied attribute(s) of the second record. An express attribute may be any data and/or data structures included in the record, such as one or more field names. An implied attribute may be any data inferred from the record, such as the address of the source computer the record was received from, the make and/or model of the source computer the record was send from, and/or the time at which the record was received.

Additionally or alternatively, routing module 222 may determine that the first record is the first type and/or the second record is the second type using one or more of the factors discussed herein. In an embodiment, routing module 222 may determine the type of each record when the record is received.

In step 330, the first source node associates the first signature with the first record and the second signature with the second record. For purposes of illustrating a clear example, assume that the first record is record 110 and the second record is record 120; however, record 110 need not include signature 112 and record 120 need not include signature 122. After receiving record 110, source node computer 242 may prepend the first signature (signature 112) to the record 110, such that the signature 112 is the first datum in record 110. After receiving record 120, source node computer 252 may prepend the second signature (signature 122) to record 120, such that signature 122 is the first datum in record 120.

Additionally or alternatively, routing module 222 may associate the first signature with the first record and the second signature with the second record by prepending the first signature to the first record and the second signature to the second record. Routing module 222 store each record in record storage device 224. Each record stored by routing module 222 may include an express signature.

In step 335, the first source node sends the first record to a first query node and the second source node sends the second record to a second query node. For example, source node computer 242 may send record 110 to query node computer 244, and source node computer 252 may send record 120 to query node computer 254. Query node computer 244 may process record 110 and query node computer 254 may process record 120.

3.5 Casting Records without Suspending Nodes

In step 340, the source nodes may determine whether the record(s) they each received belongs to a subtype of another type. If so, then control may pass to step 345. Otherwise, control may pass to step 390. For example, source node computer 242 may determine that record 110 is not an instance of a subtype based on one or more of the following: signature 112 is not associated with another signature as a subtype; record 110 is not a superset of another type of record; and/or any other factor(s) discussed herein. Accordingly, source node computer 242 may proceed to step 390.

Additional or alternatively, source node computer 242 may send record 110 to routing module 222. Routing module 222 may determine whether record 110 is an instance of a subtype of another type of record based on one or more of the methods discussed herein. If so, then routing module 222 may pass to step 345. Otherwise, routing module 222 may pass to step 390.

As another example of step 340, source node computer 252 may determine that record 120 is an instance of a super-type (the first type) based on one or more of the factors discussed herein, and proceed to step 345. Additionally or alternatively, source node computer 252 may send record 120 to routing module 222. Routing module 222 may determine record 120 is an instance of the first type based on one or more of the factors discussed herein, and proceed to step 345.

In step 345, the first source node and/or the routing module may associate the record with the super-type's signature. For example, source node computer 242 may receive a copy of the second record (record 121) from source node computer 252 and/or routing module 222. Record 121 may, but need not, be a bare record. Thus, record 121 may, but need not, include signature 122. Source node computer 242 and/or routing module 222 may prepend signature 112, and/or remove the signature 122, from record 121 as illustrated in FIG. 1.

3.6 Processing Cast Records without Suspending Nodes

In step 350, the first source node may send the record with the super-type's signature to the node associated with the super-type's signature. For example, source node computer 242 and/or routing module 222 may send record 121 to the first query node associated with the first type: query node computer 244. Control may then return to step 340. If, for example, record 120 and/or record 121 is a subtype of a third type, then the process may be repeated. Otherwise, control may proceed to step 390. In the current example, record 121 is not a subtype of an additional type, thus source node computer 242 and/or routing module 222 may proceed to step 390.

In step 390, control may terminate, wait for new records, and/or poll for new records. For example, source node computer 242 and/or routing module 222 may terminate, wait for one or more new records, and/or query and/or poll for one or more new records.

3.7 Processing New, Later-Defined Types of Records without Suspending Nodes

In the foregoing example, the records that were a second type and received from the second generation router (source computer 250), were processed by both the plurality of nodes configured to process the second type of records (nodes 252-256) and the plurality of nodes configured to process the first type of records (nodes 242-246). Thus, source node computer 252, query node computer 254, and query node 256 could process the additional data in the second type of records (the "BGP Next Hop" field), and source node computer 242, query node computer 244, and query node 246 could still process each second type of record as if a first type of record without being suspended or reconfigured.

In the foregoing example, the first and the second continuous query were received before any record of any type was received. However, the second continuous query and/or the second type of records could be received after the first continuous query and/or the first type of records were received and/or began being processed by any node. Similarly, nodes 252-256 could have been generated, instantiated, and/or initialized after nodes 242-246 began processing the first type of records.

If a third generation router began streaming a third type of record to the system illustrated in FIG. 2, and the third type of record was a subtype of the second type of record, then routing module 222 could generate, instantiate, and/or initialize one or more new nodes to process the additional data included in the third type of records. Routing module 222 may also cause each third type of record to be cast to a second type of record and processed by nodes 252-256, using one or more of the methods discussed above, without suspending and/or reconfiguring nodes 252-256. Additionally or alternatively, routing module 222 may also cause each third type of record to be cast to a first type of record and processed by nodes 242-246, using one or more of the methods discussed above, without suspending and/or reconfiguring nodes 242-246.

Using one or more of the methods discussed above, if a first type of record in a data stream was being processed according to a first continuous query by a first node, and the schema of the records in the data stream is updated to include a new field, then the routing module may send the records (which are now a second type, and a subtype of the first type) in the data stream to a second, new node. The second node may begin processing the data in the new field in each second type of record according to a second, new continuous query. The routing module may also up-cast each record as a first type of record and send each up-casted record to the first node, which is still executing the first continuous query. Thus, the first node may continue processing a first type of records and the new, second type of records without being suspended and/or reconfigured. Furthermore, each second type of record may be processed concurrently by the first node and the second node.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
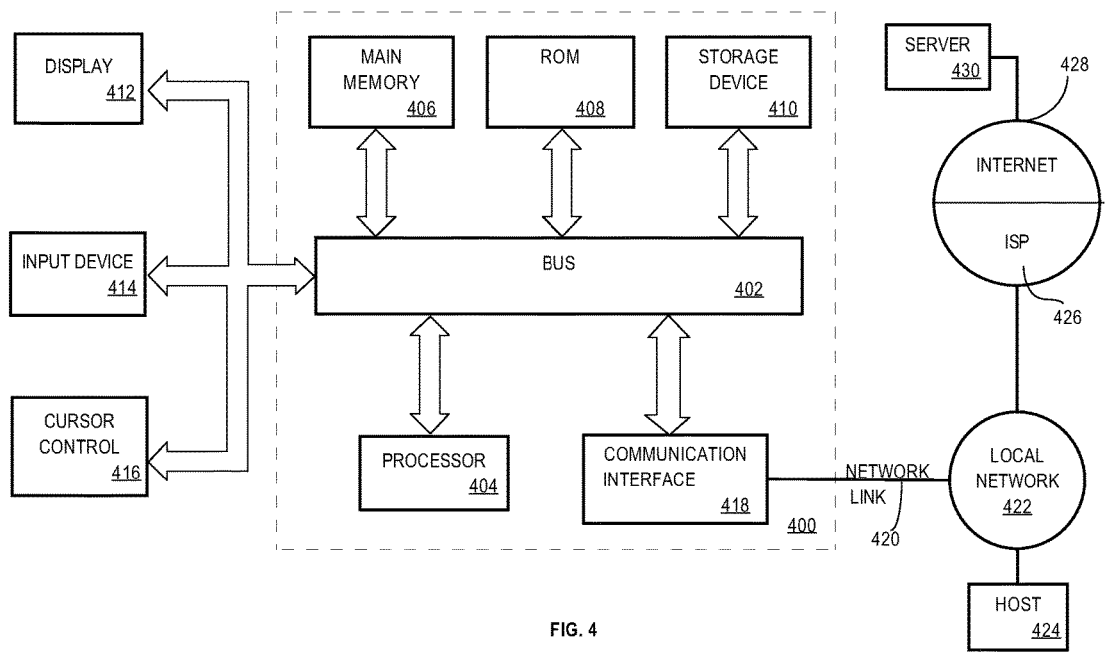
FIG. 4 illustrates a computer system upon which an embodiment may be implemented.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

5.0 EXTENSIONS AND ALTERNATIVES

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer system comprising:
a memory;
a processor coupled to the memory;
processor logic coupled to the processor and the memory configured to:
receive a first record comprising one or more first fields from a first source computer;
in response to determining that the first record is of a first type, send the first record to a first node computer that processes records of the first type but is suspended when processing records of a second type;
wherein records of the first type are organized according to a first schema and records of the second type are organized according to a second schema that is different from the first schema;
receive a second record comprising the one or more first fields and one or more second fields from a second source computer;
in response to determining that the second record is of the second type, send the second record to a second node computer that processes records of the second type;
after sending the first record to the first node computer and the second record to the second node computer, determine whether the second type is a first subtype of the first type, without suspending and reconfiguring the first node computer;
in response to determining that the second type is the first subtype of the first type, sending the second record to the first node computer to be processed, without suspending and reconfiguring the first node computer.

2. The computer system of claim 1, wherein the processor logic is configured to:
in response to determining that the first record is the first type and the first node computer is associated with the first type, send a first signature with the first record to the first node computer;
in response to determining that the second record is the second type and the second node computer is associated with the second type, send a second signature with the second record to the first node computer;
in response to determining that the second type is the first subtype of the first type, send the first signature with the second record to the first node computer.

3. The computer system of claim 1, wherein the processor logic is configured to:
organize the one or more first fields in the first record according to one or more first indices;
organize the one or more first fields in the second record according to the one or more first indices;
organize the one or more second fields in the second record according to one or more second indices, wherein each index in the one or more first indices references a memory address that is before the memory address referenced by each index in the one or more second indices.

4. The computer system of claim 1 comprising a third node computer comprising a third processor and a third memory configured to process one or more third type of records based on a third operation, wherein the processor logic is configured to:
receive, from a third source computer, a third record comprising the one or more first fields, the one or more second fields, and one or more third fields;
in response to determining that the third record is a third type and the third node computer is associated with the third type, send the third record to the third node computer to be processed;

in response to determining that the third type is a second subtype of the second type, send the third record to the second node computer to be processed without suspending and reconfiguring the second node computer;

in response to determining that the second type is the first subtype of the first type, send the third record to the first node computer to be processed without suspending and reconfiguring the second node computer.

5. The computer system of claim 1, wherein the processor logic is configured to:

determine whether the first record is the first type based on the one or more first fields included in the first record;

determine whether the second record is the second type based on the one or more first fields and the one or more second fields included in the second record;

determine whether the second type is the first subtype of the first type based on each field of the one or more first fields being included in the second record.

6. The computer system of claim 1, wherein the processor logic is configured to:

associate a first signature with the first type;
associate a second signature with the second type;
associate the second signature with the first signature as the first subtype;
determine the first record has the first signature based on one or more first field names of the one or more first fields, which are included in the first record;
determine whether the first record is the first type based on the first signature;
determine the second record has the second signature based on one or more second field names of the one or more first fields and the one or more second fields, which are included in the second record;
determine whether the second record is the second type based on the second signature;
determine whether the second type is the first subtype of the first type based on the second signature being associated with the first signature;
in response to determining that the second type is the first subtype of the first type, send the first signature with the second record to the first node computer.

7. The computer system of claim 1, wherein the processor logic is configured to:

associate a first signature with the first type;
associate a second signature with the second type;
associate the second signature with the first signature as the first subtype;
determine the first record has the first signature based on one or more first data structures in the one or more first fields, which are included in the first record;
determine whether the first record is the first type based on the first signature;
determine the second record has the second signature based on one or more second data structures in the one or more first fields and the one or more second fields, which are included in the second record;
determine whether the second record is the second type based on the second signature;
determine whether the second type is the first subtype of the first type based on the second signature being associated with the first signature;
in response to determining that the second type is the first subtype of the first type, send the first signature with the second record to the first node computer.

8. The computer system of claim 1, wherein the processor logic is configured to:

determine whether the first record is the first type based on whether the first record was received from a first source;
determine whether the second record is the second type based on whether the second record was received from a second source.

9. The computer system of claim 1, wherein:

the first node computer comprising a first processor and a first memory configured to process one or more first type of records based on a first operation;

the second node computer comprising a second processor and a second memory configured to process one or more second type of records based on a second operation;

the processor logic is configured to:

determine the second node computer has finished processing the second record;

send the second record to the first node computer after determining the second node computer has finished processing the second record.

10. The computer system of claim 9, wherein the processor logic is configured to:

send the second record to one or more sub-node computers associated with the second node computer in a particular order;

determine that each sub-node computer of the one or more sub-node computers has processed the second record in the particular order;

determine the second node computer is finished processing the second record comprises after determining that each sub-node computer of the one or more sub-node computers has processed the second record in the particular order.

11. A method comprising:

receiving a first record comprising one or more first fields from a first source computer;

in response to determining that the first record is of a first type, sending the first record to a first node computer, which is executed on a first computer, that processes records of the first type but is suspended when processing records of a second type;

wherein records of the first type are organized according to a first schema and records of the second type are organized according to a second schema that is different from the first schema;

receiving a second record comprising the one or more first fields and one or more second fields from a second source computer;

in response to determining that the second record is of the second type, sending the second record to a second node computer, which is executed on a second computer, that processes records of the second type;

after sending the first record to the first node computer and the second record to the second node computer, determining whether the second type is a first subtype of the first type, without suspending and reconfiguring the first node computer;

in response to determining that the second type is the first subtype of the first type, sending the second record to the first node computer to be processed, without suspending the first node computer;

wherein the method is performed by one or more computing devices.

12. The method of claim 11 comprising:
in response to determining that the first record is the first type and the first node computer is associated with the first type, sending a first signature with the first record to the first node computer;
in response to determining that the second record is the second type and the second node is associated with the second type, sending a second signature with the second record to the first node computer;
in response to determining that the second type is the first subtype of the first type, sending the first signature with the second record to the first node computer.

13. The method of claim 11 comprising:
organizing the one or more first fields in the first record according to one or more first indices;
organizing the one or more first fields in the second record according to the one or more first indices;
organizing the one or more second fields in the second record according to one or more second indices, wherein each index in the one or more first indices references a memory address that is before the memory address referenced by each index in the one or more second indices.

14. The method of claim 11 comprising:
receiving, from a third source computer, a third record comprising the one or more first fields, the one or more second fields, and one or more third fields;
in response to determining that the third record is a third type and a third node computer is associated with the third type, sending the third record to the third node computer, which is executed on a third computer, to be processed;
in response to determining that the third type is a second subtype of the second type, sending the third record to the second node computer to be processed without suspending the second node computer;
in response to determining that the second type is the first subtype of the first type, sending the third record to the first node computer to be processed without suspending the first node computer.

15. The method of claim 11 comprising:
determining whether the first record is the first type based on the one or more first fields included in the first record;
determining whether the second record is the second type based on the one or more first fields and the one or more second fields included in the second record;
determining whether the second type is the first subtype of the first type based on each field of the one or more first fields being included in the second record.

16. The method of claim 11 comprising:
associating a first signature with the first type;
associating a second signature with the second type;
associating the second signature with the first signature as the first subtype;
determining the first record has the first signature based on one or more first field names of the one or more first fields, which are included in the first record;
determining whether the first record is the first type based on the first signature;
determining the second record has the second signature based on one or more second field names of the one or more first fields and the one or more second fields, which are included in the second record;
determining whether the second record is the second type based on the second signature;
determining whether the second type is the first subtype of the first type based on the second signature being associated with the first signature;
in response to determining that the second type is the first subtype of the first type, sending the first signature with the second record to the first node computer.

17. The method of claim 11 comprising:
associating a first signature with the first type;
associating a second signature with the second type;
associating the second signature with the first signature as the first subtype;
determining the first record has the first signature based on one or more first data structures in the one or more first fields, which are included in the first record;
determining whether the first record is the first type based on the first signature;
determining the second record has the second signature based on one or more second data structures in the one or more first fields and the one or more second fields, which are included in the second record;
determining whether the second record is the second type based on the second signature; determining whether the second type is the first subtype of the first type based on the second signature being associated with the first signature;
in response to determining that the second type is the first subtype of the first type, sending the first signature with the second record to the first node computer.

18. The method of claim 11 comprising:
determining whether the first record is the first type based on whether the first record was received from a first source;
determining whether the second record is the second type based on whether the second record was received from a second source.

19. The method of claim 11 comprising:
determining the second node computer has finished processing the second record;
wherein sending the second record to the first node computer is performed after determining the second node computer has finished processing the second record.

20. The method of claim 19 comprising:
sending the second record to one or more sub-node computers associated with the second node computer in a particular order;
wherein determining the second node computer is finished processing the second record comprises determining that each sub-node computer of the one or more sub-node computers has processed the second record in the particular order.

* * * * *